United States Patent
Li et al.

(10) Patent No.: US 10,725,585 B2
(45) Date of Patent: Jul. 28, 2020

(54) METHOD FOR DETERMINING TOUCH POSITION AND TOUCH CONTROL CHIP

(71) Applicant: SHENZHEN GOODIX TECHNOLOGY CO., LTD., Shenzhen (CN)

(72) Inventors: Gang Li, Shenzhen (CN); Haijun Peng, Shenzhen (CN); Wing Ho Pang, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 15 days.

(21) Appl. No.: 16/167,446

(22) Filed: Oct. 22, 2018

(65) Prior Publication Data

US 2019/0056838 A1    Feb. 21, 2019

Related U.S. Application Data

(63) Continuation of application No. PCT/CN2017/095398, filed on Aug. 1, 2017.

(51) Int. Cl.
*G06F 3/041* (2006.01)
*G06F 3/044* (2006.01)
(Continued)

(52) U.S. Cl.
CPC ............ *G06F 3/0418* (2013.01); *G06F 3/044* (2013.01); *G06F 3/0446* (2019.05);
(Continued)

(58) Field of Classification Search
CPC .. G06F 3/04182; G06F 3/0418; G06F 3/0421; G06F 3/042; G06F 3/041; G06F 3/044
See application file for complete search history.

(56) References Cited

U.S. PATENT DOCUMENTS

| | | | | |
|---|---|---|---|---|
| 7,876,311 B2* | 1/2011 | Krah | ...................... | G06F 3/044 178/18.01 |
| 8,564,557 B2* | 10/2013 | Chang | ................... | G06F 3/0416 345/173 |

(Continued)

FOREIGN PATENT DOCUMENTS

| | | |
|---|---|---|
| CN | 103026326 A | 4/2013 |
| CN | 103516329 A | 1/2014 |

(Continued)

OTHER PUBLICATIONS

English Translation of CN 103516441 A1 ; Jan. 15, 2014.*

*Primary Examiner* — Vijay Shankar

(57) ABSTRACT

A method for determining a touch position and a touch control chip are disclosed. The method includes: determining (S310) a variation caused by a noise to raw data of a capacitive touch screen; determining (S320) a noise processing method of a raw value of the capacitive touch screen according to the variation caused by the noise to the raw data of the capacitive touch screen; performing (S330) noise cancellation processing on a first raw value set of the capacitive touch screen using the noise processing method, to obtain a first processed value set; and determining (S340) a touch position on the capacitive touch screen according to the first processed value set. The method for determining a touch position and the touch control chip contribute to improving accuracy of the touch position.

12 Claims, 3 Drawing Sheets

(51) Int. Cl.
*H04L 27/38* (2006.01)
*H04L 27/22* (2006.01)

(52) U.S. Cl.
CPC .......... *G06F 3/04182* (2019.05); *H04L 27/22* (2013.01); *H04L 27/38* (2013.01)

(56) References Cited

U.S. PATENT DOCUMENTS

| | | | |
|---|---|---|---|
| 9,110,546 B2* | 8/2015 | Kim | G06F 3/044 |
| 9,170,675 B2 | 10/2015 | Mo et al. | |
| 9,746,960 B2* | 8/2017 | Ding | G06F 3/0418 |
| 2008/0309628 A1 | 12/2008 | Krah et al. | |
| 2011/0025634 A1 | 2/2011 | Krah et al. | |
| 2011/0061948 A1 | 3/2011 | Krah et al. | |
| 2012/0200524 A1 | 8/2012 | Vallis et al. | |
| 2013/0271398 A1 | 10/2013 | Chuang et al. | |
| 2013/0342498 A1 | 12/2013 | Kim et al. | |
| 2014/0002412 A1 | 1/2014 | Mo et al. | |
| 2014/0049497 A1 | 2/2014 | Krah et al. | |
| 2014/0152641 A1 | 6/2014 | Yun et al. | |
| 2015/0123677 A1 | 5/2015 | Ding et al. | |
| 2015/0123950 A1 | 5/2015 | Ding et al. | |
| 2015/0220170 A1 | 8/2015 | Nam et al. | |
| 2015/0286335 A1 | 10/2015 | Haga et al. | |
| 2016/0011695 A1 | 1/2016 | Kim et al. | |
| 2017/0123523 A1 | 5/2017 | Huang et al. | |
| 2017/0123591 A1 | 5/2017 | Haga et al. | |

FOREIGN PATENT DOCUMENTS

| | | |
|---|---|---|
| CN | 103516441 A | 1/2014 |
| CN | 104520796 A | 4/2015 |
| CN | 104718702 A | 6/2015 |
| EP | 2908437 A1 | 8/2015 |

* cited by examiner

METHOD FOR DETERMINING TOUCH POSITION AND TOUCH CONTROL CHIP

CROSS-REFERENCE TO RELATED APPLICATIONS

The present application is a continuation of international application No. PCT/CN2017/095398, filed on Aug. 1, 2017, which is hereby incorporated by reference in its entireties.

TECHNICAL FIELD

The present application relates to the field of capacitive touch, and more particularly, to a method for determining a touch position and a touch control chip.

BACKGROUND

A capacitive touch screen is a human-machine interaction apparatus that mainly consists of a driving electrode and a sensing electrode. A touch control chip may drive signals with different frequencies to the driving electrode by configuration, and the sensing electrode is responsible for receiving signals. An operation, such as digital signal processing, is performed on the signals received by the sensing electrode, to obtain raw value data. The touch control chip can determine a position of a touch point on the capacitive touch screen according to the raw value data.

The capacitive touch screen is often affected by a common mode noise during use, such as a noise of a charger. In a case of a common mode interference noise, if the raw value data is mixed with noise data, it would result in abnormal mutual capacitance data, which will result in a point appearing phenomenon or a point disappearing phenomenon when it reacts to data for determining a touch position, thereby affecting detection accuracy of the touch position.

SUMMARY

The present application provides a method for determining a touch position and a touch control chip, which contribute to improving detection accuracy of the touch position.

In a first aspect, the present application provides a method for determining a touch position. The method includes: determining a variation caused by a noise to raw data of a capacitive touch screen; determining a noise processing method of raw value data of the capacitive touch screen according to the variation caused by the noise to the raw data of the capacitive touch screen; performing noise cancellation processing on a first raw value data set of the capacitive touch screen using the noise processing method, to obtain a first processed value set; and determining a touch position on the capacitive touch screen according to the first processed value set.

In the method, a noise processing method for cancelling noise interference in raw value data of a capacitive touch screen is determined according to a variation caused by a noise to raw data of the capacitive touch screen, which contributes to cancelling noise interference in a raw value data set using an appropriate and accurate noise processing method, thereby contributing to improving detection accuracy of a touch position on the capacitive touch screen.

With reference to the first aspect, in a first possible implementation manner, the determining the variation caused by the noise to the raw data of the capacitive touch screen includes: determining a raw value acquired by a touch control chip when no signal is driven to the capacitive touch screen as an amplitude variation caused by the noise to the raw data of the capacitive touch screen, where the amplitude variation serves as the variation caused by the noise to the raw data of the capacitive touch screen.

With reference to the first aspect, in a second possible implementation manner, the determining the variation caused by the noise to the raw data of the capacitive touch screen includes: determining a phase variation caused by the noise to the raw data of the capacitive touch screen according to phase differences between a plurality of raw data sets acquired correspondingly when a drive signal is output to the capacitive touch screen in a plurality of periods, where the phase variation serves as the variation caused by the noise to the raw data of the capacitive touch screen.

The plurality of periods include two or more periods. Specifically, the plurality of periods may include two adjacent periods.

With reference to the second possible implementation manner, in a third possible implementation manner, the determining the phase variation caused by the noise to the raw data of the capacitive touch screen according to the phase differences between the plurality of raw data sets acquired correspondingly when the drive signal is output to the capacitive touch screen in the plurality of periods includes: determining a maximum value in a difference set between a second raw value set of the capacitive touch screen and a reference value set, where the second raw value set is a raw value set acquired when a drive signal is output to the capacitive touch screen; determining a first sensing terminal corresponding to the maximum value; and determining the phase variation according to a phase difference between raw data corresponding to the first sensing terminal in a first raw data set of the capacitive touch screen and raw data corresponding to the first sensing terminal in a second raw data set, where the first raw data set and the second raw data set are raw data sets acquired when the drive signal is output to the capacitive touch screen.

In this possible implementation manner, the phase variation of the first sensing terminal corresponding to the maximum value in the different set serves as the variation for determining the noise processing method, which, on the one hand, can improve efficiency of acquiring the variation, and on the other hand, contributes to improving a noise cancellation effect of the determined noise processing method on a noise in the raw value data set.

With reference to the third possible implementation manner, in a fourth possible implementation manner, the phase variation $\phi$ caused by the noise to the raw data of the capacitive touch screen satisfies the following formula:

$$\phi = \sum_{i=1}^{M} (|\phi_{i1} - \phi_{i2}|)$$

where M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data set.

With reference to the fourth possible implementation manner, in a fifth possible implementation manner, the determining the variation caused by the noise to the raw data of the capacitive touch screen further includes: determining raw value data acquired when no drive signal is output to the capacitive touch screen as an amplitude variation caused by the noise to the raw data of the capacitive touch screen, where the amplitude variation serves as the variation caused by the noise to the raw data of the capacitive touch screen.

With reference to the first aspect or any one of the foregoing possible implementation manners, in a sixth possible implementation manner, the determining the noise processing method of the raw value data of the capacitive touch screen according to the variation caused by the noise to the raw data of the capacitive touch screen includes: determining a level of the noise according to the determined variation caused by the noise to the raw data of the capacitive touch screen and a configured corresponding relationship between a variation caused by a noise to raw data of a capacitive touch screen and a noise level; and determining the noise processing method of the raw value data of the capacitive touch screen from a plurality of noise processing methods according to the level of the noise and a corresponding relationship between a noise level and a noise processing method.

With reference to the first aspect or any one of the foregoing possible implementation manners, in a seventh possible implementation manner, before the determining the noise processing method of the raw value data of the capacitive touch screen according to the variation caused by the noise to the raw data of the capacitive touch screen, the method further includes: determining to perform noise cancellation processing on the raw value data of the capacitive touch screen when the variation caused by the noise to the raw data of the capacitive touch screen is greater than or equal to a first threshold value.

In this possible implementation manner, the steps in the foregoing various possible implementation manners are performed only when the variation caused by the noise to the raw data of the capacitive touch screen is greater than or equal to some threshold value, thereby avoiding unnecessary noise cancellation processing, and in turn contributing to improving accuracy of the touch position.

In a second aspect, the present application provides a touch control chip. The touch control chip includes a memory, a microprocessor control unit (MCU), a drive circuit and a sense circuit, and the MCU includes a processor and a conversion circuit.

The memory is configured to store a computer program code, a reference value set, a captured raw value set and raw data set, and the like.

The processor is configured to perform the computer program code stored in the memory, and can control the drive circuit to output a drive signal with a corresponding frequency to a touch screen, so as to drive the touch screen to work, and the processor is further configured to acquire the raw value set, and detect a touch position or the like according to the raw value set and the like.

The conversion circuit is configured to generate the raw data set according to a sense signal captured from the touch screen by the sense circuit.

The drive circuit is configured to output the drive signal with the corresponding frequency to the touch screen under the control of the processor.

The sense circuit is configured to capture the sense signal output by the touch screen under the control of the processor.

Specifically, the processor is configured to: determine a variation caused by a noise to raw data of a capacitive touch screen; determine a noise processing method of a raw value of the capacitive touch screen according to the variation caused by the noise to the raw data of the capacitive touch screen; perform noise cancellation processing on a first raw value set of the capacitive touch screen using the determined noise processing method, to obtain a first processed value set; and determine a touch position on the capacitive touch screen according to the first processed value set.

According to a touch control chip in embodiments of the present application, a noise processing method for cancelling noise interference in raw value data of a capacitive touch screen is determined according to a variation caused by a noise to raw data of the capacitive touch screen, which contributes to cancelling noise interference in a raw value data set using an appropriate and accurate noise processing method, thereby contributing to improving accuracy of a touch position on the capacitive touch screen.

With reference to the second aspect, in a first possible implementation manner, the processor is specifically configured to: determine a phase variation caused by the noise to the raw data of the capacitive touch screen according to phase differences between a plurality of raw data sets acquired correspondingly when a drive signal is output to the capacitive touch screen in a plurality of periods, where the phase variation serves as the variation caused by the noise to the raw data of the capacitive touch screen.

With reference to the first possible implementation manner, in a second possible implementation manner, the processor is specifically configured to determine a maximum value in a difference set between a second raw value set of the capacitive touch screen and the reference value set, where the second raw value set is a raw value set acquired when a drive signal is output to the capacitive touch screen; determine a first sensing terminal corresponding to the maximum value; and determine the phase variation according to a phase difference between raw data corresponding to the first sensing terminal in a first raw data set of the capacitive touch screen and raw data corresponding to the first sensing terminal in a second raw data set, where the first raw data set and the second raw data set are acquired by the conversion circuit when the drive signal is output to the capacitive touch screen.

With reference to the second possible implementation manner, in a third possible implementation manner, the processor is specifically configured to: determine the phase variation $\phi$ caused by the noise to the raw data of the capacitive touch screen according to the following formula:

$$\phi = \sum_{i=1}^{M} (|\phi_{i1} - \phi_{i2}|)$$

where M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data set.

With reference to the second aspect or any one of the possible implementation manners in the second aspect, in a fourth possible implementation manner, the processor is further configured to determine a raw value acquired when no drive signal is output to the capacitive touch screen as an amplitude variation caused by the noise to the raw data of the capacitive touch screen, where the amplitude variation serves as the variation caused by the noise to the raw data of the capacitive touch screen.

With reference to the second aspect or any one of the possible implementation manners in the second aspect, in a fifth possible implementation manner, the processor is further specifically configured to determine a level of the noise according to the variation caused by the noise to the raw data of the capacitive touch screen and a corresponding relationship between a variation caused by a noise to raw data of a capacitive touch screen and a noise level; and determine the noise processing method of the raw value of the capacitive touch screen from a plurality of noise processing methods according to the level of the noise and a corresponding relationship between a noise level and a noise processing method.

With reference to the second aspect or any one of the possible implementation manners in the second aspect, in a sixth possible implementation manner, before the processor determines the noise processing method of the raw value of the capacitive touch screen according to the variation caused by the noise to the raw data of the capacitive touch screen, the processor is further configured to: determine to perform noise cancellation processing on the raw value of the capacitive touch screen when the variation caused by the noise to the raw data of the capacitive touch screen is greater than or equal to first a threshold value.

In a possible design, a touch control chip provided by the present application may include a module configured to perform a method for determining a touch position in the first aspect or in any one of implementation manners in the first aspect, and this module may be software and/or hardware.

Another aspect of the present application provides a computer readable storage medium, the computer readable storage medium stores instructions that, when executed on a touch control chip, cause the touch control chip to perform a method for determining a touch position in the first aspect or in any one of implementation manners in the first aspect.

Another aspect of the present application provides a computer program product including instructions that, when executed on a touch control chip, cause the touch control chip to perform a method for determining a touch position in the first aspect or in any one of implementation manners in the first aspect.

DESCRIPTION OF EMBODIMENTS

Figure 1:
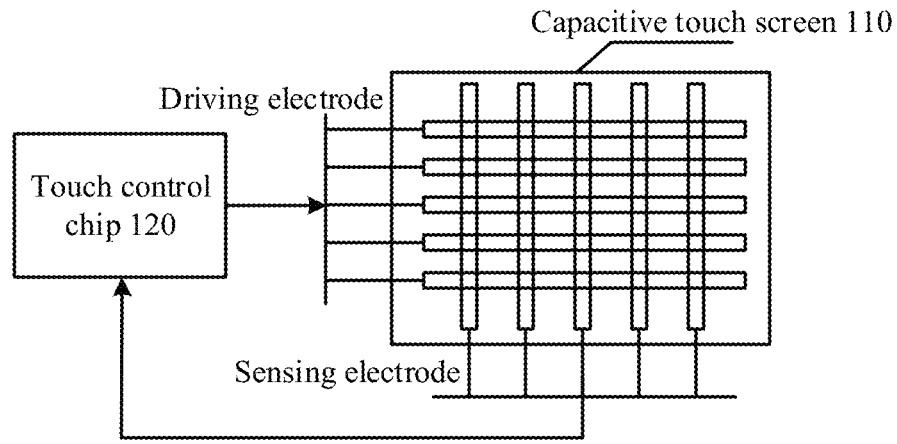
FIG. 1 is an exemplary diagram of a system of a capacitive touch screen and a touch control chip.

FIG. 1 is an exemplary diagram of a system of a capacitive touch screen and a touch control chip. It should be understood that the system illustrated in FIG. 1 is only exemplary, and the system may further include other modules or units, or include modules that are similar in function to various modules in FIG. 1. For example, a capacitive touch screen shown in FIG. 1 may be a mutual capacitance touch screen, and a capacitive touch screen in embodiments of the present application may also be a self capacitance touch screen.

As shown in FIG. 1, a capacitive touch screen 110 generally includes two sets of electrodes, one may be referred to as a lateral electrode, and the other may be referred to as a longitudinal electrode. Where the two sets of electrodes intersect may form capacitors. That is, these two sets of electrodes constitute two electrodes of the capacitive touch screen 110.

A touch control chip 120 may also be referred to as a touch controller. The touch control chip 120 may include a driving terminal (TX) and a sensing terminal (RX).

The driving terminal of the touch control chip 120 may be connected with the lateral electrode of the capacitive touch screen 110, and the sensing terminal of the touch control chip 120 may be connected with the longitudinal electrode of the capacitive touch screen 110.

The touch control chip 120 may input a signal with a certain frequency to the lateral electrode of the capacitive touch screen 110 through the driving terminal, and the signal may be referred to as a drive signal; and a signal on the longitudinal electrode of the capacitive touch screen 110 is captured through the sensing terminal, and the signal may be referred to as a sense signal.

Figure 2:
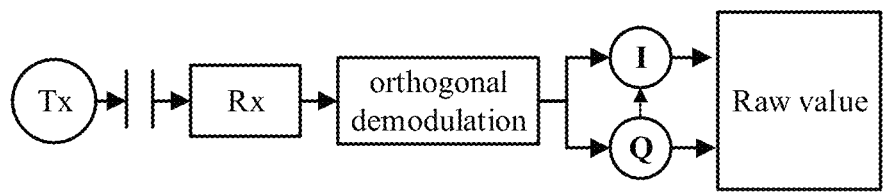
FIG. 2 is a diagram of a noise value detection principle according to an embodiment of the present application.

As shown in FIG. 2, the touch control chip 120 may obtain two signals I and Q by performing processing, such as processing of sampling, analog-to-digital conversion and orthogonal demodulation, on a sense signal captured by some sensing terminal, and the two signals may be referred to as raw data of the capacitive touch screen 110.

After the touch control chip 120 performs processing on a plurality of sense signals captured by a plurality of sensing terminals, a plurality of I signals and Q signals obtained may be referred to as a raw data set.

The touch control chip 120 may obtain a raw value RawData of the capacitive touch screen 110 by substitution of raw data into a formula $RawData=\sqrt{I^2+Q^2}$.

The touch control chip 120 may obtain a raw value set of the capacitive touch screen 110 according to the raw data set of the capacitive touch screen 110 and the foregoing formula.

The touch control chip 120 may determine a touch position on the capacitive touch screen 110 according to the raw value set of the capacitive touch screen 110 and a reference value set.

There may be a noise in the raw data, thereby causing that there may be a noise in raw value data, such as a common node noise. Therefore, it is necessary to perform noise processing on the raw value data in a raw value data set, so as to cancel or reduce an influence of the noise on the raw value data.

At present, processing methods of a noise are various; however, a touch control chip is usually configured with only one noise processing method. No matter which kind of noise processing method is configured in the touch control chip, a processing effect of a noise is not desirable.

For example, a magnitude of an influence of a noise on raw value data is not constant but randomly variable, and the influence of the noise is relatively great sometimes, and sometimes relatively small; and if only a fixed noise processing method is used to cancel the noise in the raw value data, noises of various magnitudes cannot all be processed, a desirable noise cancellation effect is not achieved, and even a side effect may occur.

If a noise processing method configured in the touch control chip can cancel a greater noise well, it is possible for the noise processing method to excessively cancel a noise of the raw value data when the noise is small, thereby causing inaccuracy of a determined touch position.

Therefore, the present application proposes a new method for determining a touch position, and the method includes a new noise processing method, to improve accuracy of a touch position determined according to processed raw value data.

Figure 3:
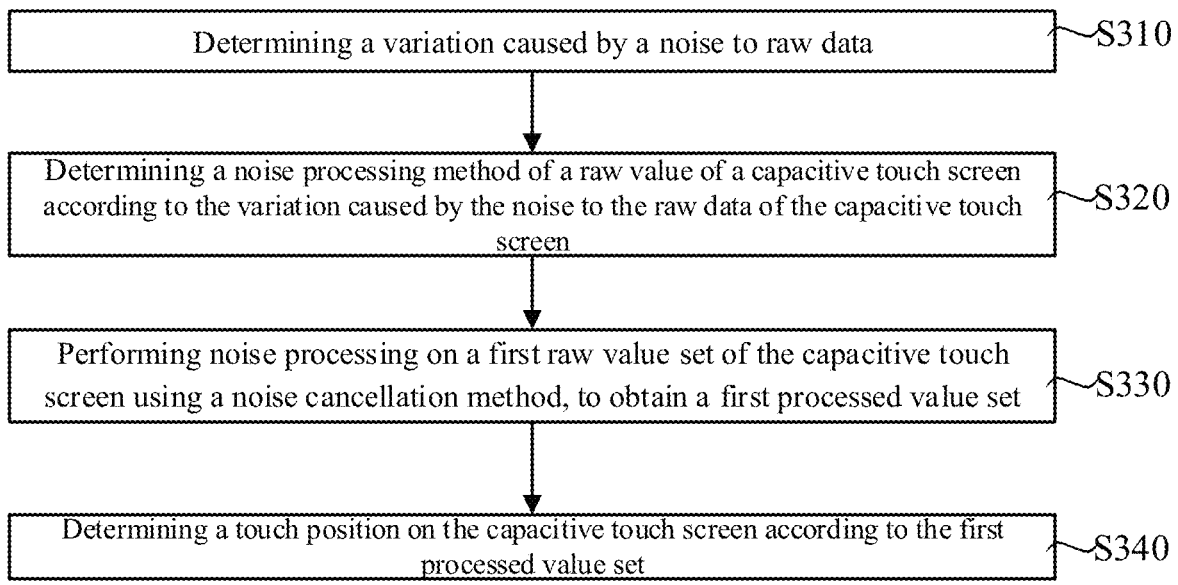
FIG. 3 is a schematic flowchart of a method for determining a touch position according to an embodiment of the present invention.

FIG. 3 is a schematic flowchart of a method for determining a touch position according to an embodiment of the present invention. It should be understood that FIG. 3 illustrates steps and operations of the method; however, these steps and operations are only exemplary, and an embodiment of the present application may also perform other operations or variations of various operations in FIG. 3. The method may be performed by a touch control chip.

S310, a variation caused by a noise to raw data of a capacitive touch screen is determined.

Here, the variation caused by the noise to the raw data may be a variation caused by the noise to an amplitude of the raw data, that is, an amplitude variation caused by the noise to the raw data; or the variation caused by the noise to the raw data may be a variation caused by the noise to a phase of the raw data, that is, a phase variation caused by the noise to the raw data; or the variation caused by the noise to the raw data may include the foregoing two types of variations.

The amplitude variation caused by the noise to the raw data of the capacitive touch screen may be determined according to a raw value set acquired by a touch control chip when the touch control chip outputs no drive signal to the capacitive touch screen. For example, an average value of all raw values in the raw value set can be determined as the amplitude variation caused by the noise to the raw data of the capacitive touch screen, where the raw value set is acquired by the touch control chip when the touch control chip outputs no drive signal to the capacitive touch screen.

When the touch control chip outputs no drive signal to the capacitive touch screen through driving terminals, all raw value data, obtained by the touch control chip according to sense signals captured from the capacitive touch screen by the sensing terminals, can be regarded as noise values.

Figure 4:
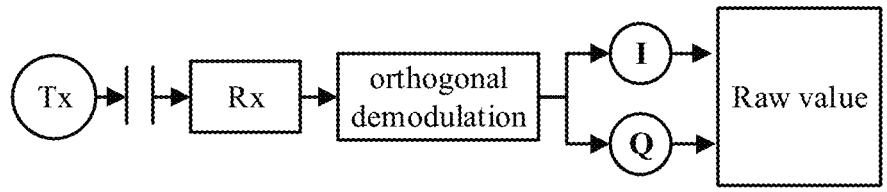
FIG. 4 is a diagram of a raw value data detection principle according to an embodiment of the present application.

A block diagram of a noise value detection principle when a touch control chip outputs no drive signal to a capacitive touch screen is shown in FIG. 4. It can be seen from FIG. 4 that when the touch control chip outputs no drive signal to the capacitive touch screen, all driving terminals of the touch control chip are grounded, all of or a part of sensing terminals of the touch control chip capture sense signals on longitudinal electrodes of the capacitive touch screen, and these sense signals are processed, such as processing of sampling, analog-to-digital conversion, orthogonal demodulation, and the like. Raw data I and Q can be obtained after each sense signal is processed. A raw value RawData of a noise value is obtained according to a formula RawData= $\sqrt{I^2+Q^2}$. A raw value set of the capacitive touch screen can be obtained according to a plurality of sense signals.

Optionally, when the touch control chip outputs no drive signal to the capacitive touch screen, a raw value or an average value of a plurality of raw values, obtained by the touch control chip according to sense signal(s) captured by one sensing terminal, can be determined as an amplitude variation caused by a noise to the raw value. For the convenience of subsequent description, the sensing terminal is referred to as a second sensing terminal.

Before the determination, the second sensing terminal may be determined first through the following manner: subtracting a raw value set acquired by the touch control chip when the touch control chip outputs a drive signal to the capacitive touch screen from a reference value set, to obtain a difference set; and determining a sensing terminal corresponding to a maximum difference in the difference set as the second sensing terminal.

A possible determination manner of a phase variation caused by a noise to raw data may include: determining the phase variation caused by the noise to the raw data of the capacitive touch screen according to a plurality of raw data sets of the capacitive touch screen, where these plurality of raw data sets are raw data sets acquired according to sense signals when the touch control chip outputs a drive signal to the capacitive touch screen in a plurality of periods, and these plurality of raw data sets are in one-to-one correspondence with these plurality of periods.

The plurality of periods referred to herein may include two or more periods. Further, the plurality of periods may include two adjacent periods. That is, the phase variation caused by the noise to the raw data of the capacitive touch screen may be determined according to two raw data sets of the capacitive touch screen, and the two raw data sets are raw data sets acquired according to sense signals when the touch control chip outputs a drive signal to the capacitive touch screen in two adjacent periods.

The determination of the phase variation caused by the noise to the raw data of the capacitive touch screen according to the two raw data sets of the capacitive touch screen may include: determining the phase variation caused by the noise to the raw data of the capacitive touch screen according to a phase difference set between the two raw data sets.

Figure 5:
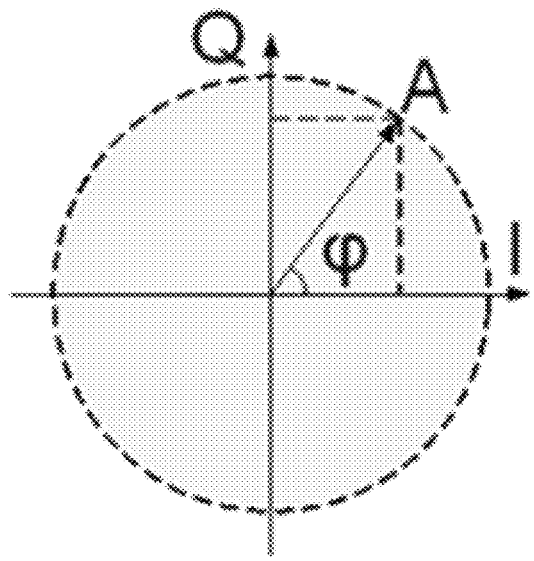
FIG. 5 is a diagram of a raw value data phase detection principle according to an embodiment of the present application.

As shown in FIG. 5, directions corresponding to raw data I and Q serve as coordinate axes, and an angle between a raw value A, corresponding to the raw data I and Q, and I can be understood as a phase $\varphi$ of the raw data.

Generally, if the raw data is not affected by a noise, $\varphi$ will not change. It should be understood that no change described here is not absolute, but it is a slight change and the change can be ignored.

If the raw data is affected by the noise, $\varphi$ changes, and a change degree of $\varphi$ is positively correlated with a magnitude of the noise. Therefore, a phase variation caused by the noise to the raw data of a capacitive touch screen may be determined according to a phase difference set between two raw data sets acquired when a touch control chip outputs a drive signal to the capacitive touch screen in two adjacent periods.

The two raw data sets may be acquired according to sense signals captured from the capacitive touch screen by one sensing terminal when the touch control chip outputs the drive signal to the capacitive touch screen in the two adjacent periods. For the convenience of subsequent description, the sensing terminal is referred to as a first sensing terminal.

Before the determination, the first sensing terminal may be determined through the following manner: subtracting a raw value set acquired when the touch control chip outputs a drive signal to the capacitive touch screen in one period from a reference value set, to obtain a difference set; and determining a sensing terminal corresponding to a maximum difference in the difference set as the first sensing terminal.

After the determination of the first sensing terminal and the two raw data sets of the capacitive touch screen, the phase variation φ" caused by the noise to the raw data of the capacitive touch screen can be obtained according to a formula $$\varphi' = \sum_{i=1}^{M} |\varphi_{i1} - \varphi_{i2}|.$$

M is a number of driving terminals of the touch control chip, or can be said to be a number of lateral electrodes of the capacitive touch screen, $\varphi_{i1}$ is a phase of $i^{th}$ raw data of the first sensing terminal acquired in a first period of the two adjacent periods, and $\varphi_{i2}$ is a phase of $i^{th}$ raw data of the first sensing terminal acquired in a second period, where the $i^{th}$ raw data represents raw data corresponding to a capacitance node that is formed by the first sensing terminal and a $i^{th}$ driving terminal.

If a variation caused by a noise to raw value includes both the phase variation caused by the noise to the raw data and the amplitude variation caused by the noise to the raw data, the first sensing terminal and the second sensing terminal may be the same, namely, the first sensing terminal and the second sensing terminal are a same sensing terminal.

Of course, the variation caused by the noise to the raw data of the capacitive touch screen can also be determined by other means. For example, a phase of raw data, acquired according to a sense signal captured by a sensing terminal when the touch control chip outputs no drive signal to the capacitive touch screen, can be determined as the variation caused by the noise to the raw data of the capacitive touch screen.

S320, a noise processing method of a raw value of the capacitive touch screen is determined according to the variation caused by the noise to the raw data of the capacitive touch screen.

The touch control chip can be configured with a corresponding relationship between a variation caused by a noise to raw data of a capacitive touch screen and a noise processing method. Thus, the touch control chip can determine the noise processing method according to the variation caused by the noise to the raw data of the capacitive touch screen and the foregoing corresponding relationship, where the noise processing method shall be used to cancel the noise in the raw value of the capacitive touch screen.

If the variation caused by the noise to the raw data of the capacitive touch screen includes a variation N caused by the noise to an amplitude of the raw data and a variation φ" caused by the noise to a phase of the raw data, the touch control chip can be configured with the following corresponding relationship: $(N \leq N_0) \&\& (\varphi'' \leq \varphi_0)$ is corresponding to recursive (IIR) filtering, and $(N_1 \leq N < N_0) \&\& (\varphi_1 \leq \varphi'' < \varphi_0)$ is corresponding to self capacitance filter frame or accelerated frequency hopping, where $N_0$ and $N_1$ are configured threshold values of a amplitude variation, and $\varphi_0$ and $\varphi_1$ are configured threshold values of a phase variation.

When the variation N caused by the amplitude of the noise to the raw data satisfies $N \leq N_0$ and the variation φ" caused by the phase of the noise to the raw data satisfies $\varphi'' \leq \varphi_0$, where N and φ" are determined by the touch control chip in real time, it can be determined that the noise processing method that shall be used is the IIR filtering, namely, the IIR filtering is performed on a raw value set of the capacitive touch screen.

The corresponding relationship between a variation caused by a noise to raw data of a capacitive touch screen and a noise processing method that is configured on the touch control chip may be obtained by performing cancellation tests on different variations multiple times using different noise processing methods.

Alternatively, a level of the noise can be determined according to the variation caused by the noise to the raw data of the capacitive touch screen, and then the noise processing method is determined according to the level of the noise.

Specifically, the touch control chip can be configured with a corresponding relationship between a variation caused by a noise to raw data of a capacitive touch screen and a noise level, and may be configured with a corresponding relationship between a noise level and a noise processing method.

S330, noise cancellation processing is performed on a first raw value set of the capacitive touch screen using the determined noise processing method, to obtain a first processed value set.

After a noise processing method that shall be used is determined, the noise cancellation processing is performed on the first raw value set of the capacitive touch screen using the noise processing method.

If the method of the noise cancellation processing is recursive filtering, the noise cancellation processing can be performed on each raw value RawDataIlow in the first raw value set according to a formula $$RawData = \frac{RawDataNow * (128 - DynamicParam) + RawDataLast * DynamicParam}{128},$$

where RawData is a value in the first processed value set obtained after the noise cancellation processing, RawDataLast is a value in a history value set after the IIR filtering, 128 refers to 128 portions into which each value RawData in the first processed value set is divided, and DynamicParam represents a ratio of each value RawDataLast in the history value set after the IIR filtering to a corresponding value RawData in the first processed value set, that is, a proportion of a history processed value RawDataLast after the IIR filtering to a corresponding value RawData in the first processed value set.

S340, a touch position on the capacitive touch screen is determined according to the first processed value set.

For example, the first processed value set may be subtracted from a reference value set, the touch position on the capacitive touch screen is determined according to a difference set obtained from the subtraction. Specifically, a position of a capacitance sensing node corresponding to a difference greater than some threshold value is the touch position.

It should be understood that the foregoing described drive signal output to the capacitive touch screen is drive signals with the same frequency in general.

In addition, in an embodiment of the present application, the noise processing method of the raw value of the capacitive touch screen can be determined in combination with another factor, in addition to the variation caused by the noise to the raw data of the capacitive touch screen, for example, the noise processing method of the raw value of the capacitive touch screen can also be determined according to a magnitude of the raw value.

Optionally, in the embodiment of the present application, before the step S320, the method further includes: determining whether to perform the noise cancellation processing on the raw value of the capacitive touch screen according to the variation caused by the noise to the raw data of the capacitive touch screen.

Specifically, the touch control chip can be configured with a threshold, and the threshold value may be referred to as a first threshold value. It is determined to perform the noise cancellation processing on the raw value of the capacitive touch screen when the variation caused by the noise to the raw data of the capacitive touch screen is greater than or equal to the first threshold value; otherwise, it is determined not to perform the noise cancellation processing on the raw value of the capacitive touch screen.

This manner can avoid a side effect caused by noise cancellation that is performed on a raw value with no need for noise processing, and thus can further contribute to improving determination accuracy of the touch position.

When it is determined to perform the noise cancelation processing on the raw value of the capacitive touch screen, the step S320 is performed, that is, determining which noise processing method is adopted for the raw value of the capacitive touch screen according to the variation caused by the noise to the raw data of the capacitive touch screen.

Figure 6:
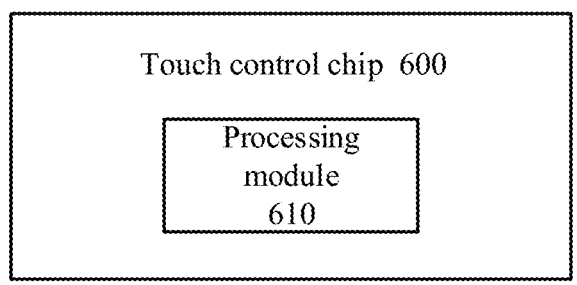
FIG. 6 is a schematic structural diagram of a touch control chip according to an embodiment of the present application.

FIG. 6 is an exemplary structural diagram of a touch control chip according to an embodiment of the present application. It should be understood that a touch control chip 600 illustrated in FIG. 6 is only exemplary, the touch control chip of embodiments of the present application may further include other modules or units, or include modules that are similar in function to various modules in FIG. 6, or not include all modules in FIG. 6.

A processing module 610 is configured to determine a variation caused by a noise to raw data of a capacitive touch screen.

The processing module 610 is further configured to determine a noise processing method of a raw value of the capacitive touch screen according to the variation caused by the noise to the raw data of the capacitive touch screen.

The processing module 610 is further configured to perform noise cancellation processing on a first raw value set of the capacitive touch screen using the noise processing method, to obtain a first processed value set.

The processing module 610 is further configured to determine a touch position on the capacitive touch screen according to the first processed value set.

In the touch control chip, a noise processing method for cancelling noise interference in a raw value of a capacitive touch screen is determined according to a variation caused by a noise to raw data of the capacitive touch screen, which contributes to cancelling the noise interference in the raw value using an appropriate and accurate noise processing method, thereby contributing to improving accuracy of a touch position on the capacitive touch screen.

Optionally, the processing module 610 may be specifically configured to determine a phase variation caused by the noise to the raw data of the capacitive touch screen according to phase differences between a plurality of raw data sets acquired correspondingly when a drive signal is output to the capacitive touch screen in a plurality of periods, where the phase variation serves as the variation caused by the noise to the raw data of the capacitive touch screen.

Optionally, the processing module 610 may be specifically configured to: determine a maximum value in a difference set between a second raw value set of the capacitive touch screen and a reference value set, where the second raw value set is a raw value set acquired when a drive signal is output to the capacitive touch screen; determine a first sensing terminal corresponding to the maximum value; and determine the phase variation according to a phase difference between raw data corresponding to the first sensing terminal in a first raw data set of the capacitive touch screen and raw data corresponding to the first sensing terminal in a second raw data set, where the first raw data set and the second raw data set are acquired when the drive signal is output to the capacitive touch screen.

Optionally, the phase variation $\phi$ caused by the noise to the raw data of the capacitive touch screen satisfies the following formula:

$$\phi = \sum_{i=1}^{M} (|\phi_{i1} - \phi_{i2}|)$$

where M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data set.

Optionally, the processing module may be further specifically configured to: determine a raw value acquired when no drive signal is output to the capacitive touch screen as an amplitude variation caused by the noise to the raw data of the capacitive touch screen, where the amplitude variation serves as the variation caused by the noise to the raw data of the capacitive touch screen.

Optionally, the processing module 610 may be specifically configured to: determine a level of the noise according to the determined variation caused by the noise to the raw data of the capacitive touch screen and a corresponding relationship between a variation caused by a noise to raw data of a capacitive touch screen and a noise level; and determine the noise processing method of the raw value of the capacitive touch screen from a plurality of noise processing methods according to the level of the noise and a corresponding relationship between a noise level and a noise processing method.

Optionally, before the processing module determines the noise processing method of the raw value of the capacitive touch screen according to the variation caused by the noise to the raw data of the capacitive touch screen, the processing module 610 may be further configured to: determine to perform noise cancellation processing on the raw value of the capacitive touch screen when the variation caused by the noise to the raw data of the capacitive touch screen is greater than or equal to a first threshold value.

The touch control chip shown in FIG. 6 can perform various steps in the method shown in FIG. 2, which will not be repeated redundantly here for the simplicity.

Figure 7:
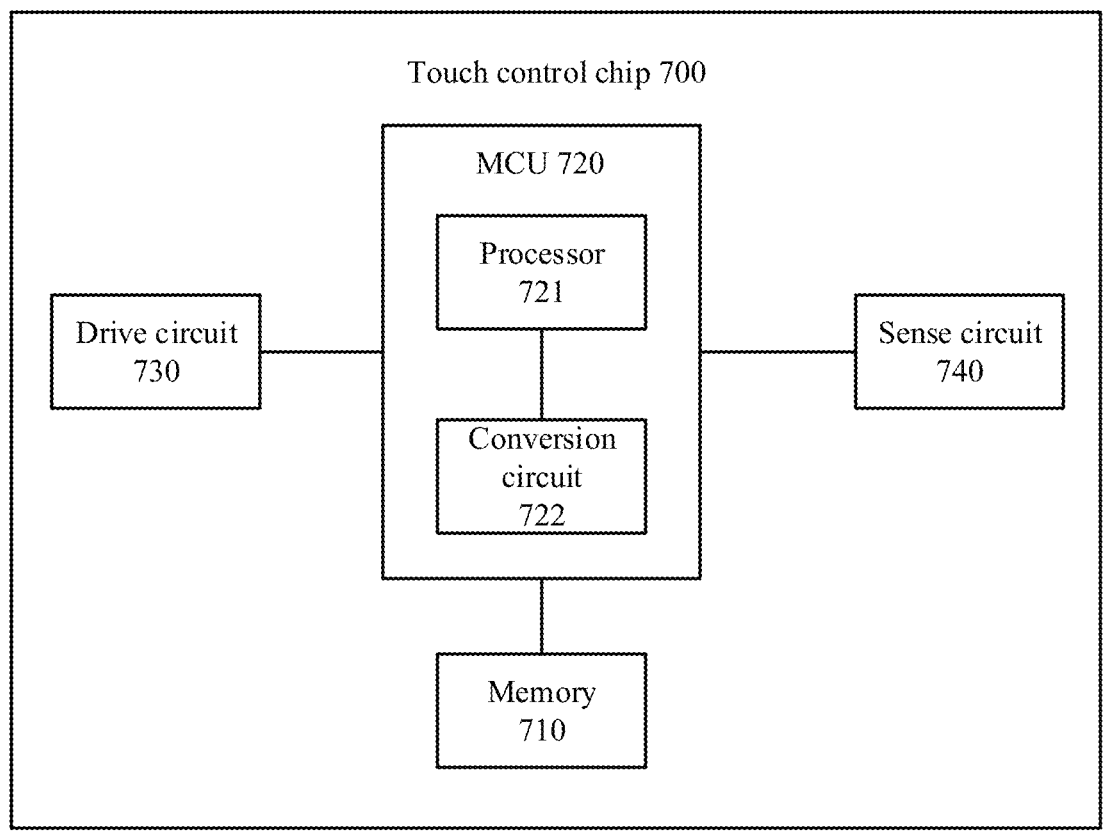
FIG. 7 is a schematic structural diagram of a touch control chip according to another embodiment of the present application.

FIG. 7 is a schematic structural diagram of a touch control chip according to another embodiment of the present application. The touch control chip is used to implement functions of the touch control chip in the embodiment shown in FIG. 3. It should be understood that a touch control chip 700 illustrated in FIG. 7 is only exemplary, the touch control chip of embodiments of the present application may further include other modules or units, or include modules that are similar in function to various modules in FIG. 7.

A memory 710 is configured to store a computer program code, a reference value set, a captured raw value set and raw data set, and the like.

A processor 721 in an MCU 720 is configured to perform the computer program code stored in the memory, and can control a drive circuit 730 to output a drive signal with a corresponding frequency to a touch screen, so as to drive the touch screen to work, and the processor 721 is further configured to acquire the raw value set, and detect a touch position or the like according to the raw value set and the like.

A conversion circuit 722 generates the raw data set according to a sense signal captured from the touch screen by a sense circuit 740.

The drive circuit 730 outputs the drive signal with the corresponding frequency to the touch screen under the control of the MCU 720.

The sense circuit 740 captures the sense signal output by the touch screen under the control of the MCU 720.

Specifically, the processor 721 is configured to: determine a variation caused by a noise to raw data of a capacitive touch screen; determine a noise processing method of a raw value of the capacitive touch screen according to the variation caused by the noise to the raw data of the capacitive touch screen; perform noise cancellation processing on a first raw value set of the capacitive touch screen using the determined noise processing method, to obtain a first processed value set; and determine a touch position on the capacitive touch screen according to the first processed value set.

According to a touch control chip in an embodiment of the present application, a noise processing method for cancelling noise interference in raw value data of a capacitive touch screen is determined according to a variation caused by a noise to raw data of the capacitive touch screen, which contributes to cancelling noise interference in a raw value data set using an appropriate and accurate noise processing method, thereby contributing to improving accuracy of a touch position on the capacitive touch screen.

Optionally, the processor 721 is specifically configured to: determine a phase variation caused by the noise to the raw data of the capacitive touch screen according to phase differences between a plurality of raw data sets acquired correspondingly when a drive signal is output to the capacitive touch screen in a plurality of periods, where the phase variation serves as the variation caused by the noise to the raw data of the capacitive touch screen.

Optionally, the processor 721 is specifically configured to determine a maximum value in a difference set between a second raw value set of the capacitive touch screen and the reference value set, where the second raw value set is a raw value set acquired when a drive signal is output to the capacitive touch screen; determine a first sensing terminal corresponding to the maximum value; and determine the phase variation according to a phase difference between raw data corresponding to the first sensing terminal in a first raw data set of the capacitive touch screen and raw data corresponding to the first sensing terminal in a second raw data set, where the first raw data set and the second raw data set are acquired by the conversion circuit when the drive signal is output to the capacitive touch screen.

Optionally, the processor 721 is specifically configured to: determine the phase variation $\phi$ caused by the noise to the raw data of the capacitive touch screen according to the following formula:

$$\phi = \sum_{i=1}^{M} (|\phi_{i1} - \phi_{i2}|)$$

where M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data set.

Optionally, the processor 721 is further configured to determine a raw value acquired when no drive signal is output to the capacitive touch screen as an amplitude variation caused by the noise to the raw data of the capacitive touch screen, where the amplitude variation serves as the variation caused by the noise to the raw data of the capacitive touch screen.

Optionally, the processor 721 is further specifically configured to determine a level of the noise according to the variation caused by the noise to the raw data of the capacitive touch screen and a corresponding relationship between a variation caused by a noise to raw data of a capacitive touch screen and a noise level; and determine the noise processing method of the raw value of the capacitive touch screen from a plurality of noise processing methods according to the level of the noise and a corresponding relationship between a noise level and a noise processing method.

Optionally, before the processor 721 determines the noise processing method of the raw value of the capacitive touch screen according to the variation caused by the noise to the raw data of the capacitive touch screen, the processor 721 is further configured to: determine to perform noise cancellation processing on the raw value of the capacitive touch screen when the variation caused by the noise to the raw data of the capacitive touch screen is greater than or equal to a first threshold value.

Those of ordinary skill in the art may be aware that, units and algorithm steps of the examples described in the embodiments disclosed in this paper may be implemented by electronic hardware or a combination of computer software and the electronic hardware. Whether these functions are implemented in the form of hardware or software is determined by specific applications and design constraint conditions of the technical solutions. Those skilled may implement the described functions by using different methods for each specific application, but this implementation should not be considered to be beyond the scope of the present application.

Those skilled in the art to which the present invention pertains may clearly understand that, for the convenience and simplicity of description, the specific working processes of the system, the apparatus and the units described above, may refer to corresponding processes in the foregoing method embodiments, and will not be repeated redundantly herein.

In the several embodiments provided in the present application, it should be understood that, the disclosed system, apparatus and method may be implemented in other manners. For example, the embodiments of the above-described apparatus are only exemplary, for example, the division of the units is only a logic function division, other division modes may be adopted in practice, e.g., multiple units or components may be combined or integrated in another system, or some characteristics may be omitted or be not executed. As another point, the displayed or discussed mutual coupling or direct coupling or communication connection may be indirect coupling or communication connection via some interfaces, apparatuses or units, and may be in electrical, mechanical or other forms.

The units described as separate components may be or may not be separated physically, components displayed as units may be physical units or not, namely, may be located in one place, or may be distributed on a plurality of network units. A part of or all of the units may be selected according to actual demand to implement the purposes of the technical solutions in the embodiments.

In addition, the functional units in the embodiments of the present application may be integrated in a processing unit, or the units singly exist physically, or two or more units are integrated in one unit.

The foregoing embodiments may be implemented in whole or in part by software, hardware, firmware, or any combination thereof. When implemented using software, the embodiments may be implemented in whole or in part in the form of a computer program product. The computer program product includes one or more computer instructions. When the computer program instructions are loaded and executed on a computer, procedures or functions described in accordance with the embodiments of the present application are generated in whole or in part. The computer can be a general purpose computer, a special purpose computer, a computer network, or another programmable apparatus. The computer instructions can be stored in a computer readable storage medium or transferred from one computer readable storage medium to another computer readable storage medium, for example, the computer instructions can be transferred from a website, computer, server or data center to another website, computer, server, or data center wiredly (such as, a coaxial cable, an optical fiber, a digital subscriber line (DSL) or wirelessly (such as, infrared, wireless, microwave, and the like). The computer readable storage medium can be any available medium that can be accessed by a computer, or a data storage device that includes a server, a data center, or the like that is integrated by one or more available media. The available medium may be a magnetic medium (such as, a floppy disk, a hard disk, a magnetic tape), an optical medium (such as, a DVD), or a semiconductor medium (such as, a solid state disk (SSD)) or the like.

Described above are the specific embodiments of the present application only, but the protection scope of the present application is not limited thereto, those skilled who are familiar with the art could readily think of variations or substitutions within the technical scope disclosed by the present application, and these variations or substitutions shall fall within the protection scope of the present application. Therefore, the protection scope of the claims should prevail over the protection scope of the present application.

What is claimed is:

1. A method for determining a touch position, comprising:
   determining a variation caused by a noise to raw data of a capacitive touch screen;
   determining a noise processing method of a raw value of the capacitive touch screen according to the variation caused by the noise to the raw data of the capacitive touch screen;
   performing noise cancellation processing on a first raw value set of the capacitive touch screen using the noise processing method, to obtain a first processed value set; and
   determining a touch position on the capacitive touch screen according to the first processed value set;
   wherein the determining the variation caused by the noise to the raw data of the capacitive touch screen comprises:
   determining a phase variation caused by the noise to the raw data of the capacitive touch screen according to phase differences between a plurality of raw data sets acquired correspondingly when a drive signal is output to the capacitive touch screen in a plurality of periods, wherein the phase variation serves as the variation caused by the noise to the raw data of the capacitive touch screen.

2. The method according to claim 1, wherein the determining the phase variation caused by the noise to the raw data of the capacitive touch screen according to the phase differences between the plurality of raw data sets acquired correspondingly when the drive signal is output to the capacitive touch screen in the plurality of periods comprises:
   determining a maximum value in a difference set between a second raw value set of the capacitive touch screen and a reference value set, wherein the second raw value set is a raw value set acquired when a drive signal is output to the capacitive touch screen;
   determining a first sensing terminal corresponding to the maximum value; and
   determining the phase variation according to a phase difference between raw data corresponding to the first sensing terminal in a first raw data set of the capacitive touch screen and raw data corresponding to the first sensing terminal in a second raw data set, wherein the first raw data set and the second raw data set are acquired when the drive signal is output to the capacitive touch screen.

3. The method according to claim 2, wherein the phase variation $\phi$ caused by the noise to the raw data of the capacitive touch screen satisfies the following formula:

$$\phi = \sum_{i=1}^{M} (|\phi_{i1} - \phi_{i2}|)$$

wherein M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data set.

4. The method according to claim 1, wherein the determining the variation caused by the noise to the raw data of the capacitive touch screen further comprises:
   determining a raw value acquired when no drive signal is output to the capacitive touch screen as an amplitude variation caused by the noise to the raw data of the capacitive touch screen, wherein the amplitude variation serves as the variation caused by the noise to the raw data of the capacitive touch screen.

5. The method according to claim 1, wherein the determining the noise processing method of the raw value of the capacitive touch screen according to the variation caused by the noise to the raw data of the capacitive touch screen comprises:
   determining a level of the noise according to the variation caused by the noise to the raw data of the capacitive touch screen and a corresponding relationship between a variation caused by a noise to raw data of a capacitive touch screen and a noise level; and
   determining the noise processing method of the raw value of the capacitive touch screen from a plurality of noise processing methods according to the level of the noise and a corresponding relationship between a noise level and a noise processing method.

6. The method according to claim 1, wherein before the determining the noise processing method of the raw value of the capacitive touch screen according to the variation caused by the noise to the raw data of the capacitive touch screen, the method further comprises:

determining to perform noise cancellation processing on the raw value of the capacitive touch screen when the variation caused by the noise to the raw data of the capacitive touch screen is greater than or equal to a threshold value.

7. A touch control chip, comprising:

a processing module configured to determine a variation caused by a noise to raw data of a capacitive touch screen;

the processing module further configured to determine a noise processing method of a raw value of the capacitive touch screen according to the variation caused by the noise to the raw data of the capacitive touch screen;

the processing module further configured to perform noise cancellation processing on a first raw value set of the capacitive touch screen using the noise processing method, to obtain a first processed value set; and the processing module further configured to determine a touch position on the capacitive touch screen according to the first processed value set;

wherein the processing module is configured to determine a phase variation caused by the noise to the raw data of the capacitive touch screen according to phase differences between a plurality of raw data sets acquired correspondingly when a drive signal is output to the capacitive touch screen in a plurality of periods, wherein the phase variation serves as the variation caused by the noise to the raw data of the capacitive touch screen.

8. The touch control chip according to claim 7, wherein the processing module is configured to:

determine a maximum value in a difference set between a second raw value set of the capacitive touch screen and a reference value set, wherein the second raw value set is a raw value set acquired when a drive signal is output to the capacitive touch screen;

determine a first sensing terminal corresponding to the maximum value; and determine the phase variation according to a phase difference between raw data corresponding to the first sensing terminal in a first raw data set of the capacitive touch screen and raw data corresponding to the first sensing terminal in a second raw data set, wherein the first raw data set and the second raw data set are acquired when the drive signal is output to the capacitive touch screen.

9. The touch control chip according to claim 8, wherein the phase variation φ caused by the noise to the raw data of the capacitive touch screen satisfies the following formula:

$$\phi = \sum_{i=1}^{M} (|\phi_{i1} - \phi_{i2}|)$$

wherein M is a number of raw data corresponding to the first sensing terminal in the first raw data set, $\varphi_{i1}$ is a phase of $i^{th}$ raw data corresponding to the first sensing terminal in the first raw data set, and $\varphi_{i2}$ is a phase of $i^{th}$ raw data corresponding to the first sensing terminal in the second raw data set.

10. The touch control chip according to claim 7, wherein the processing module is further configured to:

determine a raw value acquired when no drive signal is output to the capacitive touch screen as an amplitude variation caused by the noise to the raw data of the capacitive touch screen, wherein the amplitude variation serves as the variation caused by the noise to the raw data of the capacitive touch screen.

11. The touch control chip according to claim 7, wherein the processing module is configured to:

determine a level of the noise according to the variation caused by the noise to the raw data of the capacitive touch screen and a corresponding relationship between a variation caused by a noise to raw data of a capacitive touch screen and a noise level; and determine the noise processing method of the raw value of the capacitive touch screen from a plurality of noise processing methods according to the level of the noise and a corresponding relationship between a noise level and a noise processing method.

12. The touch control chip according to claim 7, wherein before the processing module determines the noise processing method of the raw value of the capacitive touch screen according to the variation caused by the noise to the raw data of the capacitive touch screen, the processing module is further configured to determine to perform noise cancellation processing on the raw value of the capacitive touch screen when the variation caused by the noise to the raw data of the capacitive touch screen is greater than or equal to a first threshold value.

\* \* \* \* \*